Patented Apr. 8, 1947

2,418,695

UNITED STATES PATENT OFFICE 2,418,695

ULTRAVIOLET LIGHT FILTER COMPOSITION

Robert Brown, Brooklyn, N. Y.

No Drawing. Application March 10, 1944, Serial No. 525,941

2 Claims. (Cl. 167—90)

My present invention relates to ultra-violet light filter media and aims to provide certain improvements therein. Such filter media are capable of manifold applications in the arts, one of outstanding importance in recent years being that of protecting the human skin against harmful sunburn. Among other uses may be mentioned filters for industrial purposes, dyes, varnishes and lacquers for protecting painted surfaces, and synthetic resins, etc.

I have found that roasted coffee which has been finely ground or pulverized and preferably brought to a colloidal state, that is, coffee which is ground with a suitable greasy substance such as mineral oil, glycerine, or lanolin in a colloidal mill or the like; and also that the soluble constituents of finely ground roasted coffee, principally consisting of the fatty acids and the ether extractable saponifiable and unsaponifiable matter when dissolved in a suitable solvent, possess the property of substantially entirely absorbing ultra-violet rays having wave lengths between 289 and 405 millimicrons, and that such coffee substances can be utilized as the active ingredient in preparations for protecting the skin against harmful sunburn and as ultra-violet light filters for industrial purposes. I have found that cocoa and tea also possess this property but to a much lesser degree.

In preparing my new composition, green coffee is roasted or baked at approximately 375° F. for about twenty minutes and then finely ground or pulverized. This finely ground coffee and a suitable greasy vehicle such as mineral oil, glycerine, lanolin or the like in suitable proportions, for example, one part by weight of coffee to two or more parts by weight of the vehicle, are thoroughly ground together in a colloidal mill or the like to provide a colloidal system which possesses the ultra-violet absorbing property above set forth.

An alternate method of preparing a composition possessing the desirable ultra-violet ray absorbing property is as follows: After preparing the finely ground roasted coffee, the water soluble constituents thereof are leached out for about twelve hours and then steam-extracted for about one to two hours. The coffee-water mass is then filtered and the residue is extracted with hot petroleum ether. The water extract and the petroleum ether extract are mixed together and then distilled, leaving a viscous residue which contains substantially all of the soluble constituents of the coffee. This viscous mass is then admixed with a greasy vehicle such as mineral oil, glycerin, lanolin or the like and treated as in the first example, to give the desired product.

The colloidal system containing the roasted coffee product produced in accordance with each of the methods above described were tested for their transmission of ultra-violet light by placing the material in a quartz cell in which the thickness of the material measured 0.05 ± 0.005 mm. The transmission measurements were made at the permanent lines of the mercury spectrum and showed that complete absorption of wave lengths between 289 and 405 millimicrons took place.

For use as a preventitive for sunburn and as an aid in providing tan pigmentation of the skin upon exposure to the sun, the end product of either of the methods above described may be applied in either pure or diluted form directly to the skin before exposure or they may be applied after being made up into a suitable lotion with any suitable solvent such as alcohol, or as a cosmetic by admixture with suitable waxes and oils to form a cream of proper consistency. In whatever manner the various aforementioned compounds are applied to the skin their effectiveness is primarily due to the film of the colloidal system containing the roasted coffee ocnstituents which function as an absorptive medium, screen or shield against penetration therethrough of the ultra-violet light having wave lengths between approximately 289 and 405 millimicrons. These cosmetic preparations when applied to the human skin, because of the presence of tannin acids in the roasted coffee constituents, also function to cause tan pigmentation of the skin without causing harmful burns.

Although the proportion of the colloidized roasted coffee in the lotion, cream or other vehicle may vary considerably, I have found that a lotion or cream containing from 10 to 20% of the coffee substance possesses the desirable sunburn preventing properties to a very marked degree.

By incorporating the colloidized coffee product in dyes, varnishes or lacquers it will be apparent that because of the ultra-violet light screening property of said substance, material so dyed and surfaces so protected with such varnish or lacquer will have greater life and durability when exposed to the sun's rays.

Having now fully and completely described my invention and the manner in which it is to be used, I do not desire to be limited to any specific manner or mode of application of the coffee substance to the skin or for the purposes described, and hence, in the appended claims where I have used the term "colloidal" or "colloidized" as applied to coffee, it is to be understood that said terms include the colloidal system containing the roasted coffee product made in accordance with either of the two methods disclosed, and where I have used the term "vehicle" it is to be understood that said term includes any solvent, oil, cream or other medium which serves as a carrier for the coffee substance and in facilitating its application to and disposition upon the skin of the user. It will also be appreciated that the colloidized coffee substances are not limited in their application to preventing sunburn but may also be used wherever an ultra-violet light filter is required for absorbing the rays having wave lengths between approximately 289 and 405 millimicrons.

What I claim is:

1. A filter for ultra-violet rays having wave lengths between approximately 289 and 405 millimicrons containing a film comprising a colloidal system containing pulverized roasted coffee and a greasy vehicle.

2. A cosmetic comprising a colloidal system containing pulverized roasted coffee in a greasy vehicle, the pulverized coffee being present in an amount effective to prevent sunburn.

ROBERT BROWN.

REFERENCES CITED

The following references are of record in the file of this patent:

UNITED STATES PATENTS

| Number | Name | Date |
|---|---|---|
| 82,046 | Upshur | Sept. 8, 1868 |

OTHER REFERENCES

Ruffy, Chem. Abstracts, vol. 27, p. 5838, 1933. (Copy in S. L.)

Pharmaceutical Abstracts of the Journal of the Amer. Phar. Assn., vol. 5, p. 15, Jan. 1939. (Copy in Div. 43.)